July 8, 1969 J. T. SHIOSAKI 3,454,794
TIMING CIRCUIT EMPLOYING VARIABLE OFFSET LINEAR RAMP GENERATING MEANS
Filed Jan. 30, 1967
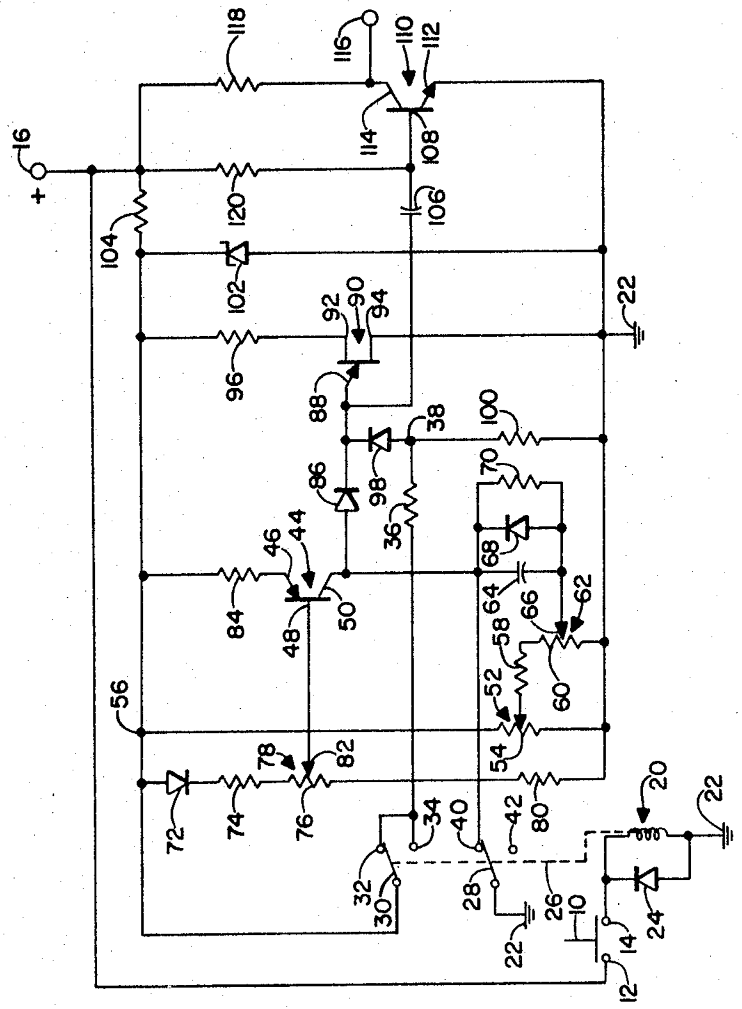
INVENTOR.
JAMES T. SHIOSAKI
BY Bruce C Lutz
ATTORNEY 3,454,794

TIMING CIRCUIT EMPLOYING VARIABLE OFFSET LINEAR RAMP GENERATING MEANS

James T. Shiosaki, El Monte, Calif., assignor to Honeywell Inc., Minneapolis, Minn., a corporation of Delaware Filed Jan. 30, 1967, Ser. No. 612,393
Int. Cl. H03k *17/28*
U.S. Cl. 307—293 3 Claims

ABSTRACT OF THE DISCLOSURE

A timing circuit which provides a delayed output a given period of time after actuation of a switch. The amount of delay can be linearly varied by an offset voltage supply and/or changing the magnitude of current supplied by a constant current generator.

The present invention is related generally to electronic circuitry and more specifically to a time delayed pulse circuit for providing output pulses which are delayed in time with respect to an input condition.

The present circuit provides a time delay which is dependent upon an input voltage. In addition, the circuit can be adjusted so that a given input voltage will produce a different time delay.

Basically, the present circuit provides a current supply means to charge an energy storage device such as a capacitor which has its base or reference voltage adjusted such that the time that it takes to charge to a given voltage is dependent upon the base voltage adjustment. When the capacitor charges to the given voltage it fires a unijunction transistor to provide an output pulse. The circuit additionally has a holding circuit such that no more output pulses will be obtained until the input condition which initiated the time delayed pulse is removed.

It is an object of the present invention to provide an improved and simplified linear voltage controlled time delay circuit.

Further objects and advantages of this invention will be ascertained from a reading of the specification and appended claims in conjunction with the single figure which shows a schematic of one embodiment of the present invention.

In the drawing a switch having a movable contact 10 has stationary contacts 12 and 14 connected respectively to a positive power source 16 and one end of a relay generally designated as 20. The other end of relay 20 is connected to ground or reference potential 22. A diode 24 is connected across the relay winding. The relay 20 has a mechanical connection shown as dash line 26 which operates two movable contacts 28 and 30 of a pair of double throw switches. Movable contact 28 is connected to ground 22 while movable contact 30 is connected to a junction point 56. Movable contact 30 is switched between contacts 32 and 34 which are externally connected together and to one end of a resistor 36 which is connected at the other end to a junction point 38. Movable contact 28 operates between stationary contacts 40 and 42. A PNP transistor 44 having an emitter 46 and a base 48 has a collector 50 connected to contact 40. A potentiometer generally designated as 52 has a resistance element 54 connected between the junction point 56 and ground 22. A resistance element 58 is connected between a movable contact of potentiometer 52 and one end of a resistance element 60 of a potentiometer generally designated as 62. The other end of the resistance element 60 is connected to ground 22. A capacitor 64 is connected between collector 50 and a movable wiper 66 of potentiometer 62. A diode or unidirection means 68 and a resistance element 70 are connected in parallel with each other and in parallel with capacitor 64. The diode 68 is connected to prevent charging of capacitor 64 when the movable contact 28 is in its normal or unactivated condition. In the present embodiment this connection is such that the direction of easy positive current flow is towards collector 50. A diode 72 is connected in series with a resistor 74 and a resistance element 76 of a potentiometer generally designated as 78 and a resistance element 80 between junction point 56 and ground 22. The diode 72 is connected in the present embodiment such that the direction of easy positive current flow is away from junction point 56. A wiper 82 of potentiometer 78 is connected to base 48. A resistance element 84 is connected between emitter 46 and junction point 56. A diode or unidirectional current control means 86 is connected between collector 50 and an emitter 88 of a unijunction transistor generally designated as 90 and having a first base 94 and a second base 92. Base 94 is connected directly to ground 22. A resistance element 96 is connected between junction point 56 and base 92. A diode or unidirectional current control means 98 is connected between junction point 38 and emitter 88. Both diodes 86 and 98 are connected such that the current flow is in the same direction as emitter 88. In this embodiment it is towards emitter 88. A resistance element 100 is connected between junction point 38 and ground 22. A Zener diode 102 is connected between junction 56 and ground 22 to provide a substantially constant voltage for the above-referenced circuitry including transistors 44 and 90. A resistance element 104 is connected between junction point 56 and power terminal 16. A capacitor 106 is connected between emitter 88 and a base 108 of an NPN transistor generally designated as 110 having an emitter 112 connected to ground 22 and a collector 114 connected to an output terminal 116. A resistive element 118 is connected between positive terminal 16 and output terminal 116. A final resistive element 120 is connected between power terminal 16 and base 108.

When the circuit is in the unactivated or normal condition as shown, the contact 28 connects collector 50 with ground 22 and prevents capacitor 64 from charging due to current from transistor 44. The diode 68 also prevents a large charge from building up on capacitor 64 due to the current supply obtained from wiper 66. Thus, due to diode 68, capacitor 64 can only charge approximately one half volt at the end connected to wiper 66 with respect to ground 22. When movable contact 10 is actuated, the relay 20 moves both contacts 28 and 30 to the second or lower position. This allows capacitor 64 to receive a charge from a current generator which comprises in part transistor 44. The amount of current flow through transistor 44 is determined by the setting of wiper 82 of potentiometer 78. If wiper 66 and/or the wiper of potentiometer 52 supplying the input voltage is set at its position nearest ground 22, the capacitor 64 will require a great deal of time to charge to a voltage which is midway between that of the voltages applied between bases 92 and 94 of unijunction transistor 90. When the capacitor 64 does charge to this voltage, however, the emitter 88 and base 94 of unijunction transistor 90 will start to conduct. This will cause an output pulse to be supplied through capacitor 106 to transistor 108 and appear at output 116. The values of resistors 36 and 100 are such that the junction point 38 is not of a voltage high enough by itself to trigger transistor 90. However, enough current flow is provided through this voltage divider network or holding circuit to keep transistor 90 in an ON condition once it has been turned ON by the voltage at capacitor 64. Thus, once transistor 90 has turned ON current flow will occur through diode 98 and emitter 88 to ground 22 through base 94. When the normally open momentary contact 10 is released, the relay 20 allows contacts 28 and 30 to return to their normal position. The time during which the movable contact 30 moves between stationary contact 34 and contact 32 is sufficient to allow transistor 90 to return to its normal or OFF condition. Thus, by the time movable contact 30 returns to contact 32 to again apply power to the holding circuit, transistor 90 is OFF and it will not turn ON again until capacitor 64 is again removed from ground potential and allowed to receive a charging current from transistor 44.

The transistor 44 along with potentiometer 78 and its associated circuitry comprise a constant current generator. The constant current supplied can be varied by adjusting wiper 82. The constant current generator in combination with capacitor 64 constitutes a linear ramp generator means since it produces linear sawtooth output signals. The potentiometers 52 and 62 provide a variable offset voltage or reference to one side of capacitor 64. Thus, the constant current generator in combination with capacitor 64 and at least one of the two potentiometers 52 and 62 constitute a variable offset linear ramp generating means.

In summary, the wipers of potentiometers 52 and 62 determine the reference level from which the timing operation is to occur. The reference level of course determines the time that it will take capacitor 64 to charge to a voltage sufficient to activate transistor 90. As is known, unijunction transistors require an emiter voltage of the standoff ratio times the base to base voltage to fire. The adjustment of the wiper of potentiometer 78 determines the charging current which also determines the amount of time necessary for capacitor 64 to charge to the required voltage. Once the required voltage is reached, the capacitor discharges through diode 86 to activate transistor 90 which is held in an ON condition by the holding circuit comprising resistors 36, 100 along with diode 98. And finally, the momentary loss of power to the holding circuit, when the switch 10 is released and deactivates relay 20, is sufficient to return unijunction transistor 90 to its OFF or inactivated condition.

While one specific embodiment of the invention has been shown it is to be realized that various modifications can be made to the circuit such as reversing the polarity of the transistors and changing the relay switching to solid state switching without departing from the invention which is to be limited only by the scope of the following claims.

I claim:

1. Linearly variable time delay apparatus comprising, in combination:

unijunction transistor means connected to a potential source, said unijunction transistor means requiring an input potential at an emitter thereof of greater than V to be activated and requiring an input current of a magnitude greater than I at the emitter thereof to remain activated;

holding circuit means having an output voltage of less than V and an output current of greater than I connected to the emitter of said unijunction transistor means;

variable offset linear ramp generating means connected to the emitter of said unijunction transistor means for supplying thereto a voltage of a magnitude greater than V and for momentarily supplying thereto a current of a magnitude greater than I; said variable offset ramp generating means comprising an energy storage means connected between a variable voltage source and a constant current generator;

means connected in circuit with said holding circuit means and said ramp generating means for activating both circuit means to initiate a time delayed pulse and for thereafter interrupting both circuit means to re-establish initial conditions; and apparatus output means for providing a time delayed output signal from the emitter of said unijunction transistor means after activation of the apparatus by said means for activating.

2. Apparatus as claimed in claim 1 wherein said energy storage means is a capacitor and said means for activating means is a switch means which establishes initial conditions by connecting a reference potential to a junction between the capacitor and the constant current generator.

3. Apparatus as claimed in claim 1 wherein unidirectional current means are utilized to provide the connections between the emitter of said unijunction transistor means and the holding circuit means and the variable offset ramp generating means.

References Cited

UNITED STATES PATENTS

| | | | |
|---|---|---|---|
| 2,970,228 | 1/1961 | White et al. | 307—293 |
| 3,244,964 | 4/1966 | Greening et al. | 307—301 XR |
| 3,259,825 | 7/1966 | James | 307—293 XR |

ARTHUR GAUSS, *Primary Examiner.*

JOHN ZAZWORSKY, *Assistant Examiner.*

U.S. Cl. X.R.

307—228, 283, 301